United States Patent [19]
Kohmoto et al.

[11] Patent Number: 5,155,515
[45] Date of Patent: Oct. 13, 1992

[54] CAMERA HAVING MOTOR-DRIVEN ZOOM LENS

[75] Inventors: Shinsuke Kohmoto; Takuji Hamasaki; Hiroaki Suzuki, all of Tokyo, Japan

[73] Assignee: Asahi Kogaku Kogyo Kabushiki Kaisha, Tokyo, Japan

[21] Appl. No.: 655,639

[22] Filed: Feb. 14, 1991

[30] Foreign Application Priority Data

Feb. 14, 1990 [JP] Japan .................. 2-13292[U]
Feb. 14, 1990 [JP] Japan .................. 2-13293[U]

[51] Int. Cl.⁵ .............................................. G03B 3/10
[52] U.S. Cl. .................................................. 354/195.1
[58] Field of Search ...................... 354/195.1, 195.12

[56] References Cited

U.S. PATENT DOCUMENTS 4,868,590  9/1989  Yokota et al. .............. 354/195.1

FOREIGN PATENT DOCUMENTS 64-44428   2/1989  Japan .
2233777    1/1991  United Kingdom .
2234079    1/1991  United Kingdom .

OTHER PUBLICATIONS

English Abstract of Japanese Abstract 64-44428.
United Kingdom Search Report, Application No. 9103201.1, Apr. 11, 1991.

*Primary Examiner*—Michael L. Gellner
*Attorney, Agent, or Firm*—Sandler, Greenblum & Bernstein

[57] ABSTRACT

A camera having a motor-driven zoom lens includes power zoom mode in which a zoom motor is rotated in a forward and reverse direction by a telephoto switch and a wide angle switch. A plurality of control zoom modes is provided in which the zoom motor is driven in modes different from the power zoom mode. A single changing switch selectively occupies three positions: a power zoom position in which the power zoom mode is performed; a mode selection position in which one specific mode can be selected from among the control zoom modes; and, a control zoom position in which the control zoom is performed at the selected control zoom mode.

15 Claims, 5 Drawing Sheets

CAMERA HAVING MOTOR-DRIVEN ZOOM LENS

BACKGROUND OF THE INVENTION

1. Field of the Invention

The present invention relates to a camera having a motor-driven zoom lens.

2. Description of Related Art

In a motor-driven zoom lens, zooming is effected by a telephoto switch and a wide-angle switch. Furthermore, a motor-driven zoom lens camera has been developed that has one, or more than one, special photographing mode (which will hereinafter be referred to as a "control zoom mode"). Such control zoom modes includes a constant image magnification mode in which the size of a main object to be photographed, such as a human figure, is kept constant in a film plane (i.e., the field of view of a finder) even if the main object moves; a zooming mode during exposure (which will hereinafter be referred to as a mid-exposure zoom mode) in which zooming is effected during exposure; and a preset zoom mode in which a focal length is changed from an optional focal length to a preset focal length.

In a known motor-driven zoom lens having more than one control zoom mode, as mentioned above, there are various switches, such as a selection switch, for selecting the control zoom modes, a changing switch for changing the control zoom modes, and a changing switch for changing a normal power zoom mode and a selected control zoom mode, etc. Such switches make the operation and construction of a camera complicated and increase the possibility of a mistake in the operation thereof.

Furthermore, in the constant image magnification mode, a photographer generally directs the camera to the main object to determine a composition and then adjusts the zooming lens so that an automatic focus adjusting operation (AF operation) is effected. Consequently, the control unit in a camera body automatically performs an arithmetic operation to determine the necessary magnification in accordance with the object distance and the focal length. These data (focal length, object distance, magnification, etc.) are set or stored in a memory of the control unit. Thereafter, the camera performs the AF operation in accordance with the main object and the control zooming to maintain constant the image magnification.

However, it is sometimes necessary for a photographer to modify the set or stored data. Accordingly, it is necessary to have a simple mechanism which can easily reset, modify and release the set or stored data.

Furthermore, in the case where a picture is taken in the control zoom mode, or the zooming is manually effected by a photographer, he or she may wish to return the focal length to a specific preset value after a picture is taken or during the zooming.

SUMMARY OF THE INVENTION

The primary object of the present invention is to provide a camera having a motor-driven zoom lens which has a good operability and in which there is little or no possibility of a mistake in operation or failure to set the desired photographing modes.

Another object of the present invention is to provide a camera having a motor-driven zoom lens in which the setting, modification, and release of special photographing modes can be easily effected.

One of the most significant features of the present invention is directed to a single operational member such as, (switch) which selectively occupies the following three positions for selecting three kinds of modes (positions):

① a power zoom position, in which zooming is effected by the operation of a telephoto switch and a wide angle switch;

② a mode selection position, in which a specific mode can be selected from among a plurality of control zoom modes; and, ③ a control zoom mode position, in which the motor-driven zoom lens is driven to a selected control zoom mode.

According to one aspect of the present invention, the operational member is automatically returned to the control zoom mode position when an operational force, which has been applied to the operational member to move to the mode selection position, is released therefrom, in view of the fact that the mode selection position is seldom selected.

According to another aspect of the present invention, in a camera having a motor driven zoom lens and at least one control zoom mode, in which the motor driven zoom lens is actuated under a predetermined condition, a provision is made for a trigger switch means which is actuated to commence the control function at the control zoom mode when the control zoom mode is selected.

The control zoom mode is, for example, a constant image magnification zoom mode. If the trigger switch means is actuated when no image magnification is set in the constant image magnification zoom mode, the trigger switch means sets a desired magnification.

The trigger switch means is, for example, actuated to renew an image magnification in the constant image magnification zoom mode.

Preferably, provision is made for an additional switch means which commences the control function of the control zoom mode when the trigger switch is turned ON. The additional switch means can be a neutral position detecting means of an actuating means for zooming, in which a neutral position is a position where no zooming is performed by the actuating means.

The present disclosure relates to subject matter contained in Japanese utility mode applications No. HEI 2-13292 and No. HEI 2-13293 both filed on Feb. 14, 1990), which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
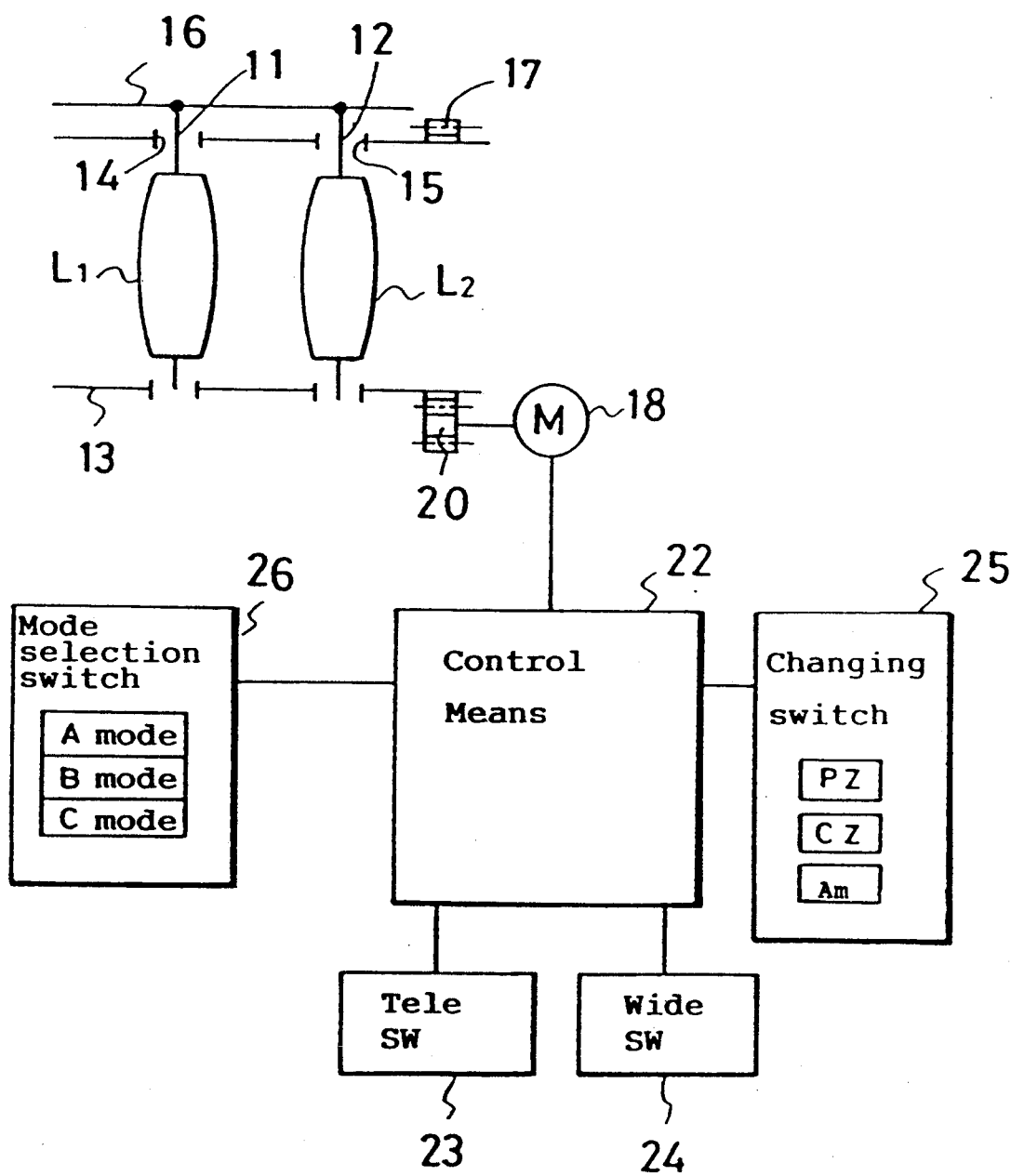
FIG. 1 is a block diagram of a camera having a motor-driven zoom lens according to one aspect of the present invention.

First and second lens groups L1 and L2, which constitute a zoom lens, have pins 11 and 12 which extend through cam grooves 14 and 15 formed in a cam ring 13, to engage with a linear movement guide means 16. The cam ring 13 is provided on its outer peripheral surface with a gear 17 which is in mesh with a pinion 20, which is in turn driven by a zoom motor 18. When the cam ring 13 is rotated by the zoom motor 18, the first and second lens groups L1 and L2 move in an optical axis direction thereof while changing a spatial distance therebetween to change a focal length of the zoom lens.

Figure 5:
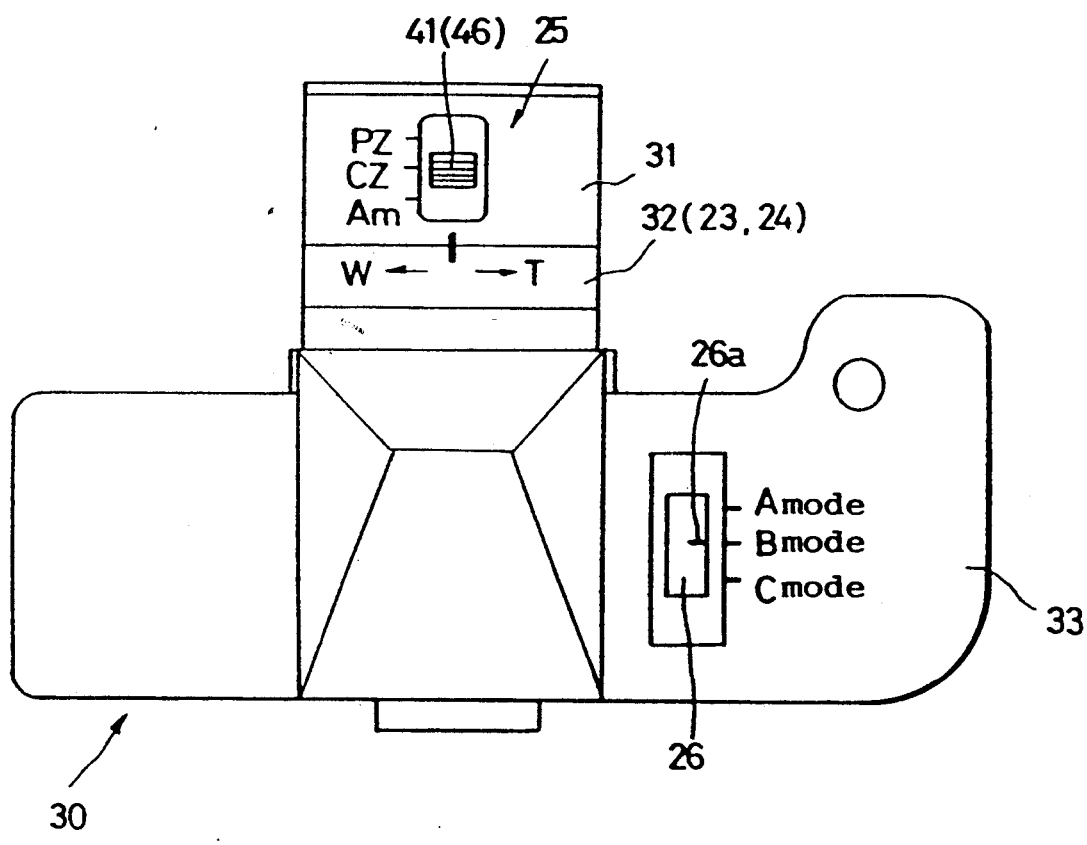
FIG. 5 is a plan view of a camera according to the present invention, and shows an arrangement of switches of a motor-driven zoom lens camera.

The zoom motor 18 is driven by a control means 22 to which information from a telephoto switch 23, a wide angle switch 24, a changing switch 25 and a mode selection switch 26 are input. The telephoto switch 23 and the wide angle switch 24 are turned ON by the rotation of a zoom operation ring 32 (FIG. 5) in a forward and reverse direction respectively. The zoom operation ring 32 is mounted to a lens barrel 31 of a single-lens reflex camera 30, so as to rotate in the forward and reverse directions. The zoom operation ring 32 is automatically returned to a neutral position when the operational force is released therefrom.

The changing switch 25 which constitutes one of the most significant features of the present invention slides to selectively occupy three positions: ① a power zoom position PZ, in which the zoom motor 18 is driven by turning on and OFF the telephoto switch 23 and the wide angle switch 24 and ② a control zoom mode position CZ; and ③ a mode-selection position Am. The changing switch 25 is provided, for example, on the lens barrel 31.

The mode-selection switch 26 selects one of the control zoom modes when the changing switch 25 is in the mode-selection position Am. In the illustrated embodiment, there are three control zoom modes A, B, and C. The control zoom modes A, B, and C correspond, for example, a constant magnification control zoom mode, a mid-exposure zoom mode, and a preset mode, respectively. The mode selection switch 26 is, for example, in the form of a slide switch with a pointer 26a (FIG. 5) provided on a camera body 33 of the single-lens reflex camera 30. To select one of the control zoom modes A, B, or C, the changing switch 25 is moved to the mode selection position Am. Thereafter, the mode selection switch 26 is slid to point the pointer 26a thereof at a desired control zoom mode A, B, or C. When the changing switch 25 is in a position other than the mode-selection position Am, the mode selection switch cannot be mechanically actuated. A software algorithm of the control means (CPU) 22 is designed so that even if the changing switch 25 is actuated at a position other than the mode selection position Am, the operation is ineffective.

When the changing switch 25 is in the control zoom mode position CZ, a picture can be taken in the selected control zoom mode.

Similarly, the zoom operation ring 32 is effective only when the changing switch 25 is, for example, in the power zoom position PZ. The zoom motor 18 is driven by the zoom operation ring 32 in accordance with the direction of rotation thereof, through the control means 22. It is possible to control the speed of the zoom motor 18 in accordance with an angular displacement of the zoom operation ring 32. Alternatively, it is also possible to design a control program of the control means 22 in such a way that if the telephoto switch 23 or the wide angle switch 24 is actuated when the changing switch 25 is in the control zoom mode position CZ, or the mode-selection position Am, the mode is automatically transferred to the power zoom mode.

In a motor-driven zoom lens which, for example, has the above-mentioned functions, the improvement of the present invention is mainly focused on the changing switch 25 which can select the power zoom position PZ, the control zoom mode position CZ, and the mode selection position Am.

Figure 2:
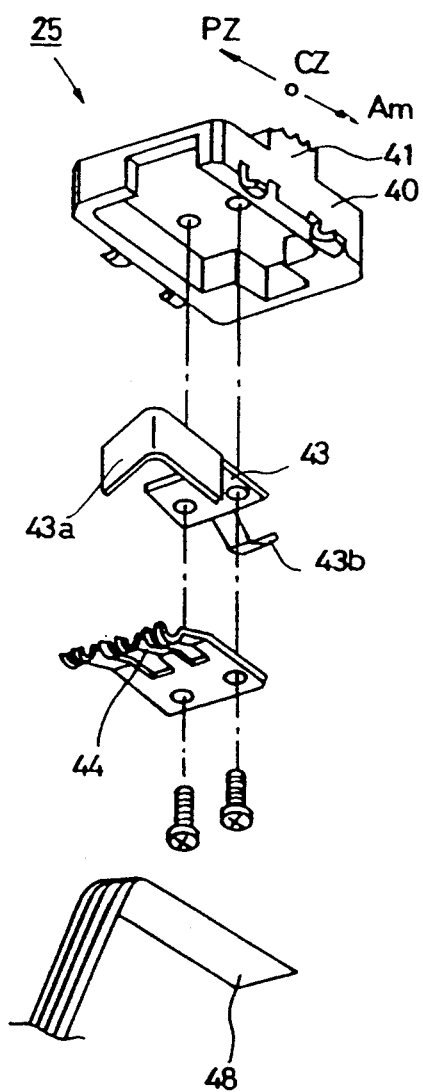
FIG. 2 is an exploded perspective view of a changing switch of the camera shown in FIG. 1.
Figure 3:
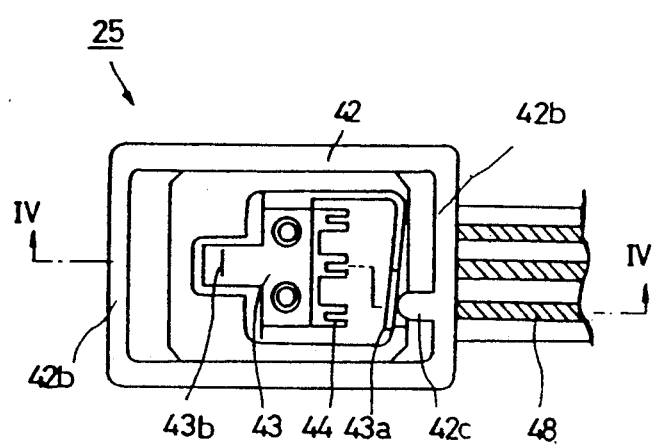
FIG. 3 is a back view of an assembly of the changing switch shown in FIG. 2.
Figure 4:
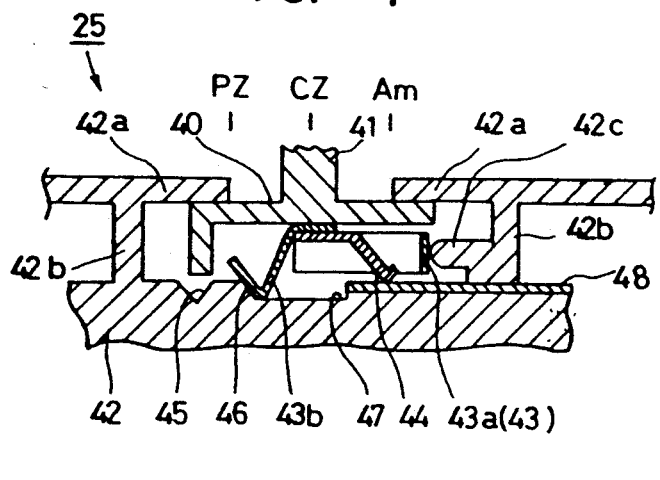
FIG. 4 is a sectional view taken along line IV—IV in FIG. 3.

The changing switch 25 will be described below in more detail with reference to FIGS. 2 through 4, in which the changing switch 25 is embodied by a slide switch.

A slide switch member 40 has a pointing projection (pointer) 41 and is slidably supported on a stationary member 42 (lens barrel 31) for linear movement. The range (displacement) and direction of the slide movement of the slide switch member 40 is restricted by a retaining wall 42a provided on the stationary member 42 to prevent the slide switch member 40 from coming out therefrom and a displacement restriction wall 42b provided on the stationary member 42.

The slide switch member 40 is provided with a leaf spring 43 and a brush 44, which are both secured thereto. The leaf spring 43 has a self-returning spring portion 43a and a click spring portion 43b. When the slide switch member 40 is moved to the power zoom position PZ, the click spring portion 43b engages a click groove 45 formed in the stationary member 42, so as to stably hold the slide switch member 40 in the power zoom position PZ. The click spring portion 43b comes into contact with a one-direction restricting wall 46 formed in the stationary member 42 when the slide switch member 40 is slid to the control zoom mode position CZ. When the slide switch member 40 is in the control zoom mode position CZ, the self-returning spring portion 43a comes into contact with a reaction projection 42c provided in the stationary member 42 and elastically deforms, so that the click spring portion 43b is elastically pressed against the one-direction restriction wall 46. The stationary member 42 has a planar portion 47 following the one direction restriction wall 46, so that when the slide switch member 40 is moved from the control zoom mode position CZ to the control zoom mode-selection position Am, only an elastic deformation of the self-returning spring portion 43a takes place.

Consequently, the slide switch member 40 is stably held in the power zoom position PZ and the control zoom mode position CZ, but when the slide switch member 40 is moved to the mode selection position Am, it is automatically returned to the control zoom mode position CZ due to the spring force of the self-returning spring portion 43a, upon release of the operational force from the slide switch member 40.

The brush 44 comes into sliding contact with a flexible printed circuit board (flexible PC board) 48 provided on the stationary member 42 to send position data of the power zoom position PZ, the control zoom mode position CZ and the mode selection position Am to the control means 22, in accordance with the sliding position of the slide switch member.

In the changing switch 25 as constructed above, the slide switch member 40 which is in the mode selection position Am which is considered as a most infrequent position is automatically returned to the control zoom mode position CZ when the operational force is released from the slide switch member 40. According to the automatic return to the control zoom mode position CZ, a photographer can normally take a picture at the control zoom mode position CZ, thus resulting in an improved operability and less chance of error during operation. If the slide switch member 40 was stably held in the mode selection position Am, a picture can be taken neither in the control zoom mode nor in the power zoom mode, so that a photographer may miss a shutter chance (that is, an opportunity to take a photograph). The position to which the slide switch member 40 is automatically returned can be the power zoom position PZ instead of the control zoom mode position CZ.

As can be understood from the foregoing, according to the present invention, since the three mode positions of the power zoom position, the control zoom mode position and the mode selection position can be selected by the single changing switch, operability is increased.

In particular, when a mode selection position which is seldom used is selected, the mode is automatically returned to the control zoom mode position upon release of the operational force, so that the possibility of error during operation or failure to set the mode can be decreased.

Figure 6:
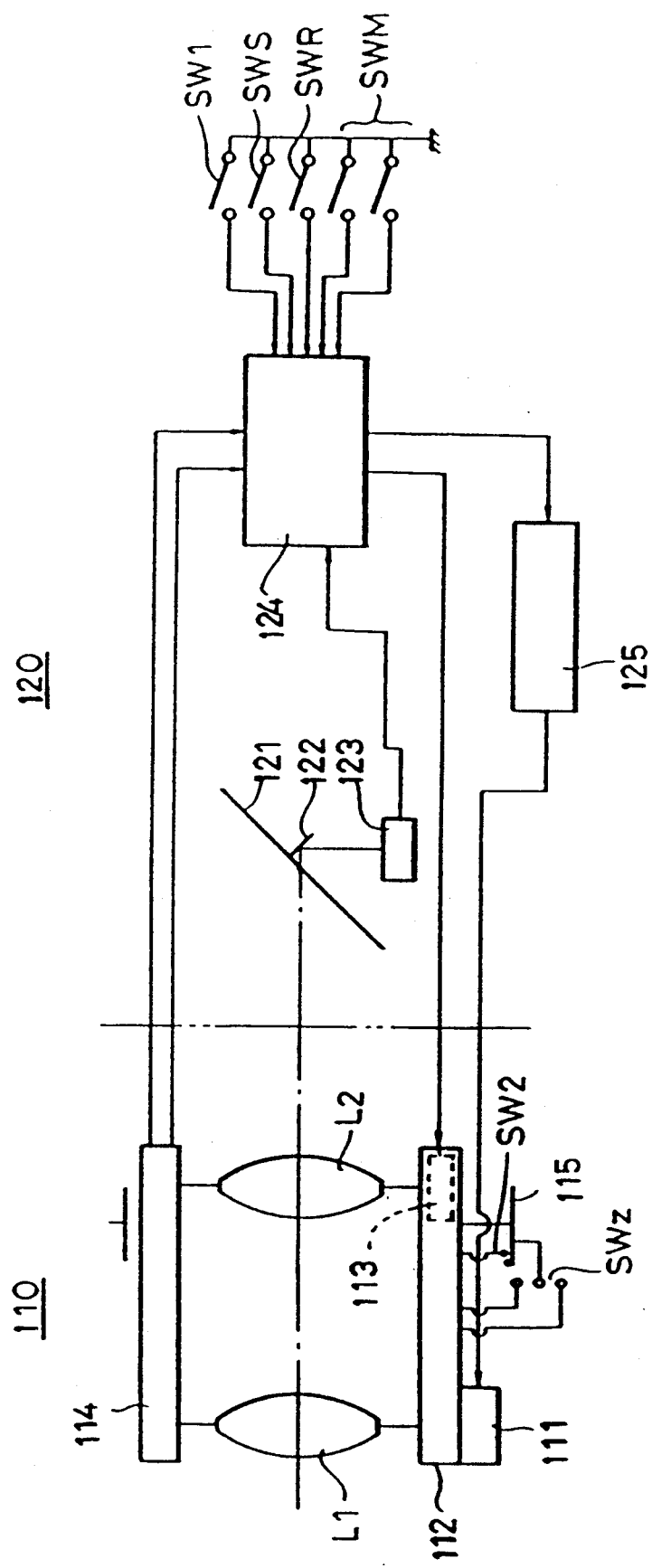
FIG. 6 is a block diagram of a camera having a motor-driven zoom lens according to another aspect of the present invention; and, FIG. 7 is a flow chart of the operation of a camera in a constant image magnification mode, according to the present invention.
Figure 7:
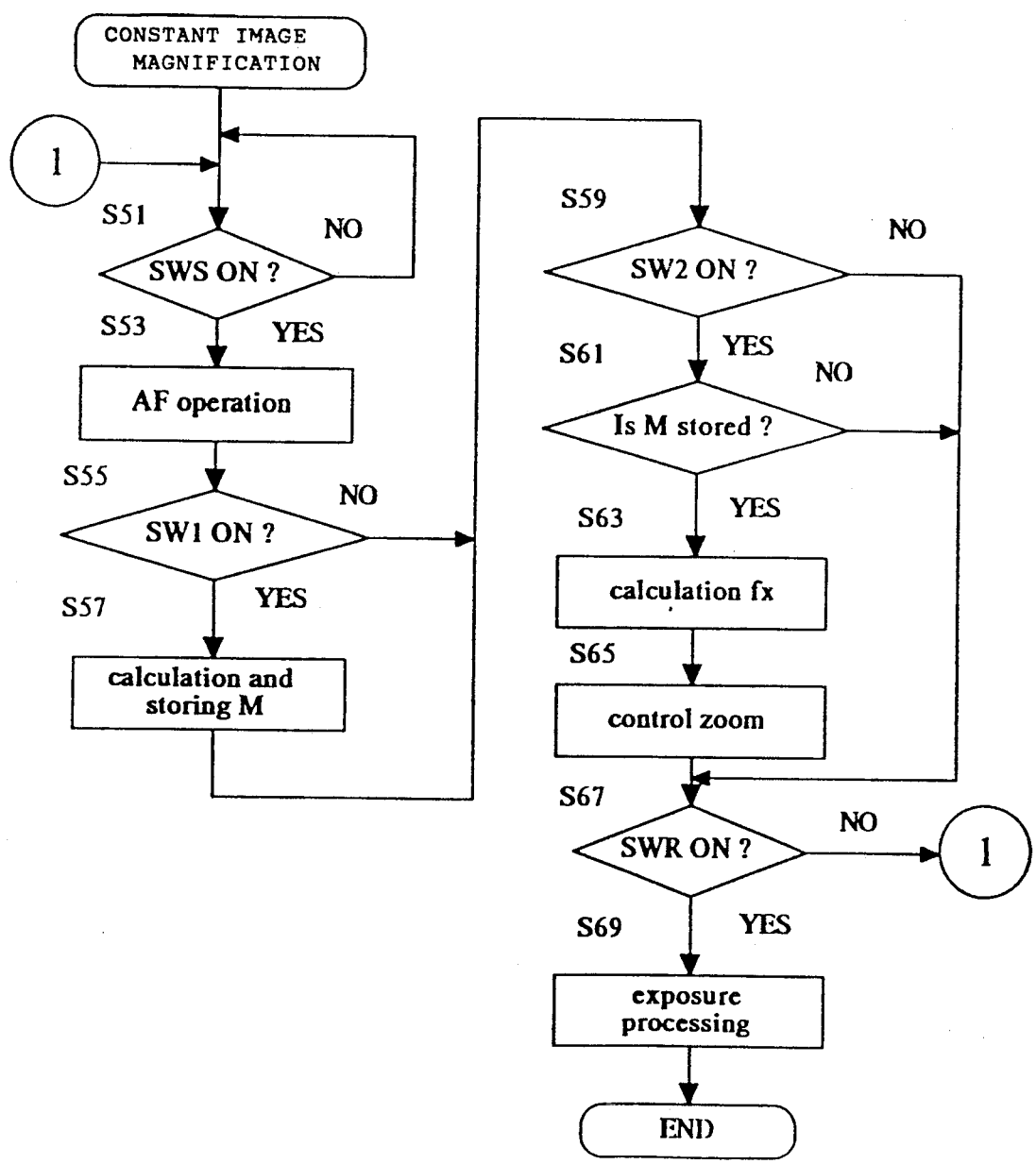

FIGS. 6 and 7 show a second embodiment of a motor-driven zoom lens camera according to the present invention.

A motor-driven zoom lens 110 has a first lens group L1 and a second lens group L2. The first lens group L1 is moved by a focus-adjusting mechanism 111 to adjust the focus. The first and second lens groups L1 and L2 are moved by a zoom mechanism 112 to change the focal length. A known cam mechanism which includes a cam ring having cam grooves can be used as the focus-adjusting mechanism 111 and the zoom mechanism 112. In the illustrated embodiment, the focus-adjusting mechanism 111 is driven by the AF motor provided in the camera body and the zoom mechanism 112 is driven by a zoom motor 113 provided in the zoom lens 110.

The position of the focusing lens group L1 and the focal length of the zoom lens 110 are read by a data-reading mechanism 114 and are sent to a camera body 120 through electrical contact pins (not shown) provided on a mount of the camera body.

The zoom lens 110 is provided with a zoom operation ring 115 which serves as an operation switch of the power zooming and as a manual zoom operation ring. The zoom operation ring 115 is rotatable and movable in an optical axis direction.

The zoom operation ring 115 is associated with a zoom switch SWZ when the zoom operation ring 115 is located at one end (i.e., power zoom position) of the limit of the displacement thereof in the optical axis direction. The zoom switch SWZ has two contacts which are normally kept OFF. When the zoom operation ring 115 is rotated in a right direction or a left direction at the power zoom position, one of the contacts is turned ON, so that the zoom motor 113 rotates in a predetermined direction. As a result, the first and second lens groups L1 and L2 are moved in the optical axis direction in accordance with the direction of the rotation of the zoom motor 113 to effect the zooming towards the telephoto side or the wide angle side. Namely, the zoom switch SWZ corresponds to the telephoto switch 23 and the wide angle switch 24 in FIG. 1. At the power zoom position, the zoom operation ring 115 is disconnected from the zoom mechanism 112 (cam ring) and is biased by a spring (not shown) into an intermediate position in which the zoom switch SWZ is turned OFF.

When the zoom operation ring 115 is located at the other end (i.e., manual zoom position) of the limit, it is in association with the zoom mechanism 112 (cam ring), and the zoom switch SWZ cannot be turned ON. Also, when the zoom operation ring 115 is in the manual zoom position, the zoom motor 113 is disengaged from the zoom mechanism 112. When the zoom operation ring 115 is rotated in a clockwise or counterclockwise direction at the manual zoom position, the first and second lens groups L1 and L2 are moved in the optical axis direction to effect the zooming towards the telephoto side or the wide angle side, in accordance with the direction of the rotation.

When the zoom operation ring 115 is in the intermediate position (i.e., neutral position) in the optical axis direction, rotation thereof is restricted. At the intermediate position of the zoom operation ring 115, the mechanical connection between the zoom mechanism 112 and the zoom operation ring 115 is broken, and the zoom switch SWZ is turned OFF. Furthermore, at the intermediate position of the zoom operation ring 115, a neutral position detection switch SW2 is turned ON, which is turned OFF when the zoom operation ring 115 is rotated in the clockwise or counterclockwise direction.

The mechanism for establishing and breaking the connection between the zoom operation ring 115 and the zoom mechanism 112, and between the zoom mechanism 112 and the zoom motor 113 can be realized by a frictional clutch or toothed clutch mechanism, which is known per se. The zoom operation ring 115 is stopped and clicks at the afore-mentioned three positions in the optical axis direction.

A portion of light transmitted through the first and second lens groups L1 and L2 of the motor-driven zoom lens 110 attached to the camera body 120 passes through a half mirror portion of a main mirror 121 and is reflected by an auxiliary mirror 122. The reflected is made incident upon a phase difference detection (PDD) type of CCD object distance measuring sensor 123, which sends phase difference data of images divided in two of an object to be taken to a control circuit 124, which functions as a control means.

Based on the phase difference data, the control circuit 124 performs a predictor operation to detect the amount of defocus, so that an AF motor 125 is driven to drive the focus-adjusting mechanism 111 to thereby adjust the focal point.

In addition, the control circuit 124 drives the zoom motor 113 to effect the control zooming.

Position data of the focusing lens L1 and focal length data f, both read by the data-reading mechanism 114, are inputted to the control circuit 124.

The camera body 120 is provided with an object distance measuring switch SWS which commences photometering and automatic focusing operations; a release switch SWR which drives the mirror 121, a shutter and a diaphragm (not shown) to effect the exposure; a mode selection switch SWM which selects the constant image magnification zoom mode; and a trigger switch means SW1 which commences the operation at the constant image magnification zoom mode when the constant image magnification zoom mode is selected. These switches are connected to input ports of the control circuit 124.

In the illustrated embodiment of FIGS. 1 through 5, the constant image magnification zoom mode is set when the mode selection switch 26 selects mode A at the mode selection position Am of the changing switch 25.

The operation process during the constant image magnification zoom mode is as follows:

Supposing that the focused object distance (object distance of the main object), the focal length, and the magnification set at the constant image magnification zoom mode are $D_o$, $f_o$ and M, respectively, we have:

$$M = f_o/D_o$$

If the object distance D changes thereafter, the focal length fx is adjusted to satisfy the following relation:

$$Mx = fx/Dx = M$$

$$\therefore fx = M \cdot Dx \quad (1),$$

wherein Dx is the object distance to be focused, and Mx is the image magnification. This is the constant image magnification zoom mode.

FIG. 7 shows a flow chart of the operations of the motor-driven zoom lens according to the present invention.

The operations are performed by the control circuit 124, in accordance with a program stored in a ROM incorporated in the control circuit 124.

If photometer switch SWS is turned ON when the constant image magnification zoom mode is selected by the mode selection switch SWM, the control circuit 124 performs an AF operation (steps S51 and S53).

Upon completion of the AF operation, the control circuit 124 checks whether the trigger switch means SW1 is turned ON at step S55. If the trigger switch means SW1 is turned ON, the object distance data D of the main object and the focal length f are read by the data-reading circuit 114 to calculate the image magnification M, which is then stored in the ROM (step S57).

Conversely, if the trigger switch means SW1 is OFF at step S55, it is determined whether neutral position detecting switch SW2 is turned ON; that is, whether the zoom operation ring 115 in the neutral position is (step S59). If the zoom operation ring 115 is in the neutral position, it is determined at step S61 whether the image magnification M is memorized. If the image magnification M is memorized, the focal length fx which gives the present magnification Mx identical to the memorized image magnification M is calculated, based on equation (1) mentioned above at step S63. As a result, the control zooming operation is effected to meet the focal length fx (step S65).

Conversely, if no image magnification is memorized, neither the calculation of the focal length fx nor zooming are effected. In other words, the constant image magnification zoom mode is carried out only when trigger switch means SW2 is turned ON.

Thereafter, it is checked at step S67 whether the release switch SWR is turned ON. If the release switch SWR is turned ON, an exposure process is carried out at step S69. If the release switch SWR is not turned ON, control is returned to step S51.

If the zoom operation ring 115 is not in the neutral position at step S59, control skips to step S67 to check whether the release switch SWR is turned ON without effecting the control zooming, since in this case, it is considered that a photographer is intentionally performing the zooming to change the focal length f. Alternatively, it is possible to give priority to the control zooming when the zoom operation ring 115 is in the power zoom position. Note that a photometering operation can be performed after the photometer switch SWS is turned ON and before the operation of a release switch SWR (not shown) is checked.

As can be seen from the above discussion, the image magnification is set (renewed) by actuating the trigger switch means SW1 at the constant image magnification zoom mode. If a photographer optionally performs the zooming and then actuates the trigger switch means SW1 at the constant image magnification zoom mode, the image magnification of the object is set. Thereafter, the control zooming is performed to keep the image magnification constant. Accordingly, the setting and modification of the image magnification can be easily and effectively effected.

Although the above-mentioned embodiments are directed to a constant image magnification zoom mode, the application of the present invention is not limited thereto. For instance, the invention can be applied to the preset zoom mode, as follows: every time the trigger switch means SW1 is actuated, the focal length can be preset. The trigger switch means SW1 can also be used as a set button of a zoom limiter which limits a zooming range.

It is possible to provide the trigger switch means SW1 on the zoom lens 110.

Although the above-mentioned embodiments are addressed to a single-lens reflex camera, the present invention can be generically applied to any camera having a motor-driven zoom lens.

We claim:

1. A camera having a motor-driven zoom lens, comprising:
   a power zoom mode in which a zoom motor is rotated in a forward and reverse direction by a telephoto switch and a wide angel switch;
   a plurality of control zoom modes in which said zoom motor is driven in modes different from said power zoom mode; and,
   a single changing switch which selectively occupies three positions of:
   a power zoom position in which said power zoom mode is performed;
   a mode selection position in which one specific mode can be selected from said control zoom modes; and,
   a control zoom position in which a control zoom is performed at a selected control zoom mode.

2. A camera having a motor-driven zoom lens, according to claim 1, wherein said changing switch comprises a slide switch which can slide to successively come to said power zoom position, said control zoom position and said mode selection position.

3. A camera having a motor driven zoom lens, according to claim 2, wherein said slide switch comprises a stabilizing means for holding said slide switch to said power zoom position and said control zoom position.

4. A camera having a motor driven zoom lens, according to claim 2, wherein said slide switch further comprises a self-returning means for automatically returning said slide switch to said control zoom position upon release of an external operational force applied to said slide switch to move said slide switch to said mode selection position.

5. A camera having a motor driven zoom lens, according to claim 1, wherein said control modes comprise a constant image magnification control mode in which an image magnification of a main object to be photographed is kept constant in a picture plane, a mid-exposure control mode in which zooming is effected, and a preset mode in which zooming is effected so that an optional focal length is changed to a preset focal length.

6. A camera having a motor-driven zoom lens, according to claim 3, wherein said stabilizing means comprises a slide switch member which comprises said changing switch, a stationary member which slidably supports said slide switch member, a V-shaped groove provided in said stationary member, a recess having a one-direction restricting wall and provided adjacent to said V-shaped groove, a leaf spring member provided on said slide switch member and having a click spring portion which elastically comes into engagement with said V-shaped groove and said one direction restricting wall, and means for biasing said slide switch member, so that said click spring portion of said leaf spring member comes into elastic contact with said one-direction restricting wall.

7. A camera having a motor-driven zoom lens, according to claim 6, wherein said power zoom position and said control zoom position are defined by said click spring portion when the latter engages with said V-shaped groove and said one-direction restricting wall, respectively.

8. A camera having a motor driven zoom lens, according to claim 7, wherein said slide switch member is move to said mode-selection position when said click spring portion of said slide switch member moves in said recess against said biasing means.

9. A camera, comprising;
a motor driven zoom lens;
at least one control zoom mode in which said motor-driven zoom lens is actuated under a predetermined condition; and,
a trigger switch means for commencing a control function of said control zoom mode when said control zoom mode is selected.

10. A camera according to claim 9, wherein said zoom control mode comprises a constant image magnification zoom mode.

11. A camera according to claim 10, wherein said trigger switch means is actuated to renew an image magnification at said constant image magnification zoom mode.

12. A camera according to claim 9, further comprising an additional switch means which commences said control function of said control zoom mode when said trigger switch is turned ON.

13. A camera according to claim 12, further comprising means for actuating said motor drive zoom lens.

14. A camera according to claim 13, wherein said additional switch means comprises means for detecting a neutral position of said actuating means, said neutral position being a position in which no zooming is performed by said actuating means.

15. The camera of claim 1, wherein said single changing switch is positioned on said zoom lens.

* * * * *

UNITED STATES PATENT AND TRADEMARK OFFICE
CERTIFICATE OF CORRECTION

PATENT NO. : 5,155,515
DATED : October 13, 1992
INVENTOR(S) : S. KOHMOTO et al.

It is certified that error appears in the above-indentified patent and that said Letters Patent is hereby corrected as shown below:

At column 8, line 48 (claim 1, line 5), change "angel" to ---angle---.

Signed and Sealed this

First Day of October, 1996

Attest:

BRUCE LEHMAN

Attesting Officer     Commissioner of Patents and Trademarks